(12) United States Patent
Yahaba et al.

(10) Patent No.: US 9,157,437 B2
(45) Date of Patent: Oct. 13, 2015

(54) ROTARY COMPRESSOR WITH OILING MECHANISM

(71) Applicant: FUJITSU GENERAL LIMITED, Kawasaki-Shi, Kanagawa (JP)

(72) Inventors: Shingo Yahaba, Kanagawa (JP); Naoya Morozumi, Kanagawa (JP)

(73) Assignee: FUJITSU GENERAL LIMITED, Kanagawa (JP)

(*) Notice: Subject to any disclaimer, the term of this patent is extended or adjusted under 35 U.S.C. 154(b) by 110 days.

(21) Appl. No.: 13/794,422

(22) Filed: Mar. 11, 2013

(65) Prior Publication Data
US 2013/0259725 A1    Oct. 3, 2013

(30) Foreign Application Priority Data
Mar. 27, 2012    (JP) .................................. 2012-072507

(51) Int. Cl.
| | |
|---|---|
| *F04C 18/00* | (2006.01) |
| *F16N 7/36* | (2006.01) |
| *F04C 23/00* | (2006.01) |
| *F04C 29/02* | (2006.01) |
| *F04C 18/356* | (2006.01) |

(52) U.S. Cl.
CPC .............. *F04C 18/00* (2013.01); *F04C 18/3564* (2013.01); *F04C 23/008* (2013.01); *F04C 29/023* (2013.01); *F04C 29/025* (2013.01); *F16N 7/366* (2013.01); *F04C 2230/60* (2013.01); *F04C 2240/603* (2013.01)

(58) Field of Classification Search
CPC ........... F04C 18/3564; F04C 2240/603; F04C 29/023; F04C 29/025; F04C 18/00; F16N 7/36; F16N 7/363; F16N 7/366
USPC ............ 418/83, 88, 91, 94, 98, 55.6, 64, 156; 29/888.025; 184/27.4, 31, 6.16, 6.18, 184/6.11
See application file for complete search history.

(56) References Cited

U.S. PATENT DOCUMENTS

| | | | | |
|---|---|---|---|---|
| 5,803,718 | A | * | 9/1998 | Woo ............................ 417/372 |
| 6,079,967 | A | * | 6/2000 | Fujiwara ....................... 418/220 |
| 6,171,090 | B1 | * | 1/2001 | Hurley .......................... 418/94 |
| 6,182,794 | B1 | * | 2/2001 | Lee ............................... 184/6.18 |

(Continued)

FOREIGN PATENT DOCUMENTS

| | | | |
|---|---|---|---|
| JP | 2011032933 A | * | 2/2011 |
| JP | 2011-032933 | | 3/2011 |

OTHER PUBLICATIONS

Australian Office Action issued on Aug. 21, 2014 in Australian Patent Application No. 2013201311.

*Primary Examiner* — Thomas Denion
*Assistant Examiner* — Xiaoting Hu
(74) *Attorney, Agent, or Firm* — McDermott Will & Emery LLP

(57) ABSTRACT

A rotary compressor includes an oiling mechanism that contains a vertical fitting hole formed on a countershaft portion in the lower part of the rotating shaft, and an oil pipe having an inlet port at the lower end and an opening at the upper end. The upper part of the oil pipe is press-fitted into the vertical fitting hole. The oiling mechanism further contains a pump vane having a vane portion and a base portion. The vane portion is twisting processed and inserted into the vertical oil hole to provide a space. The base portion is fixed into the lower part of the oil pipe that has an inner diameter smaller than the width thereof.

6 Claims, 5 Drawing Sheets

(56) References Cited

U.S. PATENT DOCUMENTS

| | | | |
|---|---|---|---|
| 6,960,070 B2* | 11/2005 | Kammhoff et al. | 418/55.6 |
| 7,223,082 B2* | 5/2007 | Sato et al. | 418/11 |
| 7,473,081 B2 | 1/2009 | Ogasawara et al. | |
| 7,473,083 B2* | 1/2009 | Oh et al. | 418/55.6 |
| 7,581,936 B2 | 9/2009 | Ogasawara et al. | |
| 2002/0067998 A1* | 6/2002 | Narney et al. | 417/371 |
| 2003/0108438 A1* | 6/2003 | Kim et al. | 417/312 |
| 2005/0115771 A1* | 6/2005 | Shin | 184/6.16 |
| 2006/0210408 A1* | 9/2006 | Ogasawara et al. | 417/410.3 |
| 2008/0112831 A1* | 5/2008 | Ogasawara et al. | 418/97 |
| 2011/0027117 A1 | 2/2011 | Fujino et al. | |

* cited by examiner

ROTARY COMPRESSOR WITH OILING MECHANISM

CROSS-REFERENCE TO RELATED APPLICATIONS

The present application claims priority to and incorporates by reference the entire contents of Japanese Patent Application No. 2012-072507 filed in Japan on Mar. 27, 2012.

BACKGROUND OF THE INVENTION

1. Field of the Invention

The present invention relates to a rotary compressor used in an air-conditioning unit and a refrigerating machine.

2. Description of the Related Art

Conventionally, there is disclosed a rotary compressor including a hollow compressor housing having a refrigerant inlet and a refrigerant outlet, a compressing unit that is placed in the lower part of the compressor housing and compresses a refrigerant sucked through the refrigerant inlet, a motor that is placed in the upper part of the compressor housing and drives the compressing unit via a rotating shaft, and an oiling mechanism that supplies lubricating oil retained in the lower part of the compressor housing to a sliding portion of the compressing unit through an oil hole of the rotating shaft. The oiling mechanism includes an housing hole that is formed on a countershaft portion of the rotating shaft, has an opening to the lower end of the countershaft portion, and is communicated with the oil hole; an oil pipe that has a lubricating oil hole on the lower end thereof and the upper end thereof is open, and is attached to the housing hole; and a plate-like pump vane that is housed in the housing hole and the oil pipe, where a wide portion formed in the longitudinal middle part thereof is firmly fixed onto the upper inner surface of the oil pipe (for example, see Japanese Patent Application No. 2011-032933).

The wide portion of the pump vane is press-fitted into the upper inner surface of the oil pipe, and there is a space between the other portion of the pump vane other than the wide portion and the inner surface of the oil pipe. The upper part of the oil pipe is press-fitted into the housing hole.

However, according to the above-described conventional technology, the wide portion of the pump vane is press-fitted into the upper inner surface of the oil pipe, and the upper part of the oil pipe is press-fitted into the housing hole formed on the countershaft portion. Consequently, the above-described conventional technology had the following problem. That is, since the oil pipe, whose diameter was expanded due to the press-fit of the pump vane, was press-fitted into the housing hole, when the countershaft portion was thin, the countershaft portion became deformed and its diameter got expanded, which brought about an increase in sliding resistance of the rotating shaft.

Accordingly, there is a need to solve the problem above and provide a rotary compressor including an oiling mechanism that is capable of preventing deformation or diameter expansion of a countershaft portion of a rotating shaft.

SUMMARY OF THE INVENTION

The present invention is directed to a rotary compressor that satisfies the need. The rotary compressor includes a hermetically-sealed compressor housing that contains a refrigerant outlet in the upper part thereof and a refrigerant inlet in the lower part thereof, and retains lubricating oil in the lower part thereof; a compressing unit that is placed in the lower part of the compressor housing and compresses a refrigerant sucked through the refrigerant inlet to discharge the compressed refrigerant through the refrigerant outlet; and a motor that is placed in the upper part of the compressor housing and contains a rotating shaft connected to the compressing unit to drive the compressing unit via the rotating shaft. The rotating shaft has a vertical oil hole and a lateral oil hole for supplying the lubricating oil.

The rotary compressor further includes an oiling mechanism that supplies the lubricating oil to the compressing unit through the vertical oil hole and the lateral oil hole.

The oiling mechanism includes a vertical fitting hole that is formed on a countershaft portion in the lower part of the rotating shaft; and an oil pipe that has an inlet port at the lower end and an opening at the upper end. The upper part of the oil pipe is press-fitted into the vertical fitting hole.

The oiling mechanism further includes a pump vane that contains a vane portion formed of an elongate plate and a base portion made wider than the vane portion. The vane portion is twisting processed and inserted into the vertical oil hole to provide a space. The base portion is pressed and fixed into the lower part of the oil pipe that has an inner diameter smaller than the width thereof.

According to the arrangement, the countershaft portion is not deformed due to the deformation of the oil pipe.

DETAILED DESCRIPTION OF THE PREFERRED EMBODIMENTS

An exemplary embodiment of a rotary compressor according to the present invention is explained in detail below with reference to accompanying drawings. Incidentally, the present invention is not limited to the embodiment.

Figure 1:
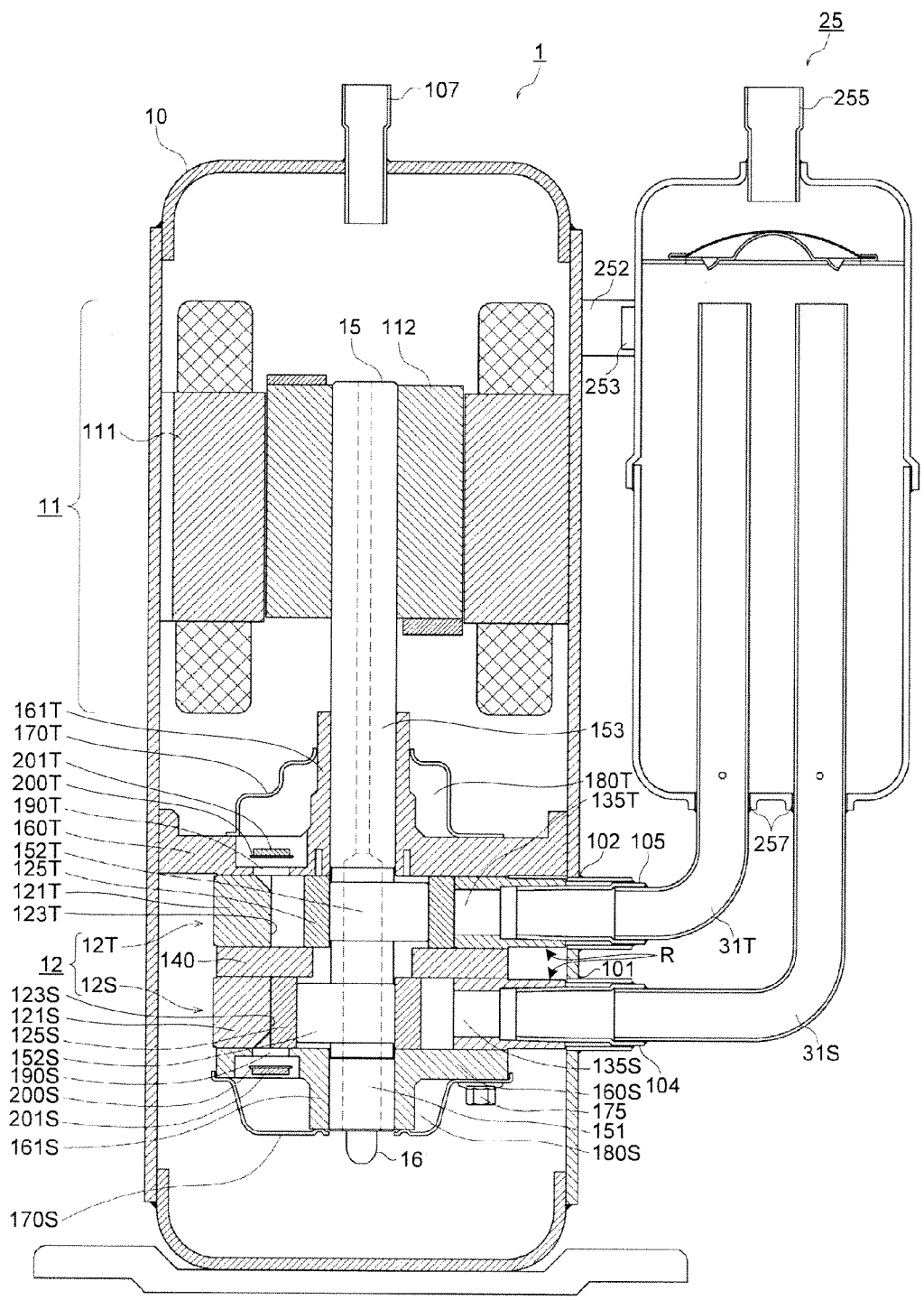
FIG. 1 is a longitudinal sectional view illustrating a rotary compressor according to an embodiment of the present invention.
Figure 2:
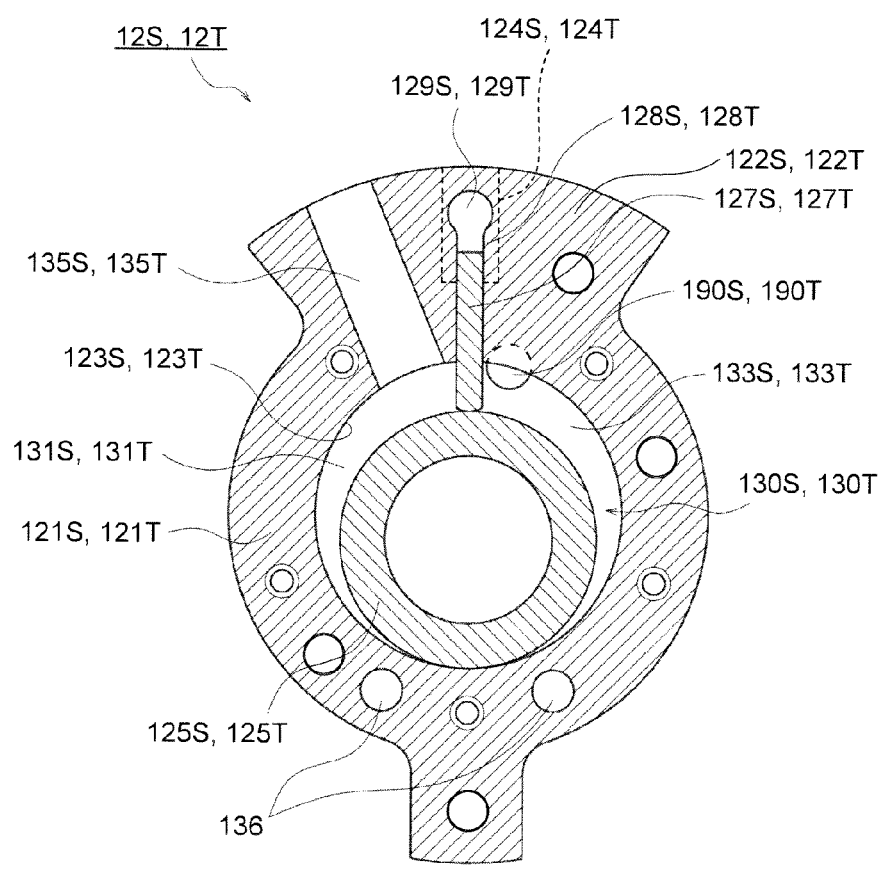
FIG. 2 is a transverse sectional view of first and second compressing units.

FIG. 1 is a longitudinal sectional view illustrating a rotary compressor according to an embodiment of the present invention. FIG. 2 is a transverse sectional view of first and second compressing units.

As illustrated in FIG. 1, a rotary compressor 1 according to the embodiment includes a compressing unit 12 and a motor 11. The compressing unit 12 is placed in the lower part of a hermetically-sealed vertical cylindrical compressor housing 10. The motor 11 is placed in the upper part of the compressor housing 10, and drives the compressing unit 12 via a rotating shaft 15.

A stator 111 of the motor 11 is formed into a cylindrical shape, and is shrink-fitted onto the inner circumferential surface of the compressor housing 10. A rotor 112 of the motor 11 is placed within the cylindrical stator 111, and is shrink-fitted onto the rotating shaft 15 mechanically connecting the motor 11 and the compressing unit 12.

The compressing unit 12 includes a first compressing unit 12S and a second compressing unit 12T. The second compressing unit 12T is placed on top of the first compressing unit 12S to be aligned parallel with the first compressing unit 12S. As illustrated in FIG. 2, the first and second compressing units 12S and 12T include annular first and second cylinders 121S and 121T, respectively. First and second inlet ports 135S and 135T and first and second vane grooves 128S and 128T are radially formed on first and second laterally-flared portions 122S and 122T of the first and second cylinders 121S and 121T.

As illustrated in FIG. 2, the first and second cylinders 121S and 121T have circular first and second cylinder inner walls 123S and 123T having the same center as the rotating shaft 15 of the motor 11, respectively. Within the first and second cylinder inner walls 123S and 123T, first and second annular pistons 125S and 125T having the outer diameter smaller than the cylinder inner diameter are placed, respectively. First and second operation chambers 130S and 130T, which suck, compress, and discharge refrigerant gas, are formed between the first and second cylinder inner walls 123S and 123T and the first and second annular pistons 125S and 125T.

On the first and second cylinders 121S and 121T, the first and second vane grooves 128S and 128T across the height of the cylinder are formed from the first and second cylinder inner walls 123S and 123T in a radial direction. Plate-like first and second vanes 127S and 127T are slidably fitted into the first and second vane grooves 128S and 128T, respectively.

As illustrated in FIG. 2, first and second spring holes 124S and 124T are formed on the back part of the first and second vane grooves 128S and 128T in a manner to communicate from the periphery of the first and second cylinders 121S and 121T to the first and second vane grooves 128S and 128T. Vane springs (not illustrated) for pressing the back side of the first and second vanes 127S and 127T are inserted into the first and second spring holes 124S and 124T. When the rotary compressor 1 is started, the first and second vanes 127S and 127T are projected outward from the first and second vane grooves 128S and 128T into the first and second operation chambers 130S and 130T by repulsive force of the vane springs, and the tips of the first and second vanes 127S and 127T come in contact with the outer circumferential surfaces of the first and second annular pistons 125S and 125T, and the first and second operation chambers 130S and 130T are partitioned into first and second suction chambers 131S and 131T and first and second compression chambers 133S and 133T by the first and second vanes 127S and 127T.

Furthermore, first and second pressure introducing paths 129S and 129T are formed in the first and second cylinders 121S and 121T. The first and second pressure introducing paths 129S and 129T communicate the back part of the first and second vane grooves 128S and 128T with the inside of the compressor housing 10 through openings R illustrated in FIG. 1, and introduce the compressed refrigerant gas in the compressor housing 10 into the first and second vane grooves 128S and 128T to apply back pressure on the first and second vanes 127S and 127T with pressure of the refrigerant gas.

To suck a refrigerant from the outside into the first and second suction chambers 131S and 131T, the first and second cylinders 121S and 121T have the first and second inlet ports 135S and 135T for communication between the first and second suction chambers 131S and 131T and the outside.

Furthermore, as illustrated in FIG. 1, an intermediate partition plate 140 is placed between the first cylinder 121S and the second cylinder 121T to separate and block up the first operation chamber 130S of the first cylinder 121S and the second operation chamber 130T of the second cylinder 121T. A lower end plate 160S is placed on the lower end of the first cylinder 121S, and blocks up the first operation chamber 130S of the first cylinder 121S. An upper end plate 160T is placed on the upper end of the second cylinder 121T, and blocks up the second operation chamber 130T of the second cylinder 121T.

A countershaft bearing 161S is formed on the lower end plate 160S, and a countershaft portion 151 of the rotating shaft 15 is rotatably supported by the countershaft bearing 161S. A main shaft bearing 161T is formed on the upper end plate 160T, and a main shaft portion 153 of the rotating shaft 15 is rotatably supported by the main shaft bearing 161T.

The rotating shaft 15 includes a first eccentric portion 152S and a second eccentric portion 152T which are out of phase by 180 degrees. The first eccentric portion 152S is rotatably fitted into the first annular piston 125S of the first compressing unit 12S, and the second eccentric portion 152T is rotatably fitted into the second annular piston 125T of the second compressing unit 12T.

When the rotating shaft 15 rotates, the first and second annular pistons 125S and 125T revolve in clockwise direction in FIG. 2 within the first and second cylinders 121S and 121T along the first and second cylinder inner walls 123S and 123T. The first and second vanes 127S and 127T make a reciprocating movement in accordance with the revolution of the first and second annular pistons 125S and 125T. With the movements of the first and second annular pistons 125S and 125T and the first and second vanes 127S and 127T, capacities of the first and second suction chambers 131S and 131T and the first and second compression chambers 133S and 133T continuously change, and the compressing unit 12 continuously sucks, compresses and discharges refrigerant gas.

As illustrated in FIG. 1, a lower muffler cover 170S is placed on the lower side of the lower end plate 160S to form a lower muffler chamber 180S together with the lower end plate 160S. Then, the first compressing unit 12S opens into the lower muffler chamber 180S. Namely, a first outlet port 190S (see FIG. 2) for communication between the first compression chamber 133S of the first cylinder 121S and the lower muffler chamber 180S is formed near the first vane 127S of the lower end plate 160S, and the first outlet port 190S is provided with a first outlet valve 200S for preventing the backflow of compressed refrigerant gas.

The lower muffler chamber 180S is one chamber formed into an annular shape, and is a part of a communication path communicating the outlet side of the first compressing unit 12S into an upper muffler chamber 180T through a refrigerant path 136 (see FIG. 2) penetrating the lower end plate 160S, the first cylinder 121S, the intermediate partition plate 140, the second cylinder 121T, and the upper end plate 160T. The lower muffler chamber 180S reduces pressure pulsation of discharged refrigerant gas. Furthermore, a first outlet valve holder 201S for limiting a deflection valve opening amount of the first outlet valve 200S is superposed on the first outlet valve 200S, and is fastened together with the first outlet valve 200S by rivets. The first outlet port 190S, the first outlet valve 200S, and the first outlet valve holder 201S compose an outlet valve section of the lower end plate 160S.

As illustrated in FIG. 1, an upper muffler cover 170T is placed on the upper side of the upper end plate 160T, and the upper muffler chamber 180T is formed between the upper muffler cover 170T and the upper end plate 160T. A second outlet port 190T (see FIG. 2) for communication between the second compression chamber 133T of the second cylinder 121T and the upper muffler chamber 180T is formed near the second vane 127T of the upper end plate 160T, and the second outlet port 190T is provided with a second outlet valve 200T for preventing the backflow of compressed refrigerant gas. Furthermore, a second outlet valve holder 201T for limiting a deflection valve opening amount of the second outlet valve 200T is superposed on the second outlet valve 200T, and is fastened together with the second outlet valve 200T by rivets. The upper muffler chamber 180T reduces pressure pulsation of discharged refrigerant. The second outlet port 190T, the second outlet valve 200T, and the second outlet valve holder 201T compose an outlet valve section of the upper end plate 160T.

The first cylinder 121S, the lower end plate 160S, the lower muffler cover 170S, the second cylinder 121T, the upper end plate 160T, the upper muffler cover 170T, and the intermediate partition plate 140 are fastened together as one body by a through bolt 175. Out of the compressing unit 12 including the above components fastened together as one body by the through bolt 175, the outer periphery of the upper end plate 160T is firmly fixed to the compressor housing 10 by spot welding, thereby fixing the compressing unit 12 to the compressor housing 10.

On the outer circumferential surface of the cylindrical compressor housing 10, first and second through-holes 101 and 102 are formed to let first and second suction pipes 104 and 105 through the compressor housing 10; the first and second through-holes 101 and 102 are arranged at a distance in an axial direction so that the first through-hole 101 is located below the second through-hole 102. Furthermore, on the outside of the lateral side of the compressor housing 10, an accumulator 25 composed of an independent cylindrical closed container is held by an accumulator holder 252 and an accumulator band 253.

A system connecting pipe 255 connecting the accumulator 25 to a refrigeration cycle is attached to the center of the top of the accumulator 25. First and second low-pressure communication pipes 31S and 31T are inserted into bottom through-holes 257 formed on the bottom of the accumulator 25; one end of the first and second low-pressure communication pipes 31S and 31T extends upward inside the accumulator 25, and the other end thereof is attached to one end of the first and second suction pipes 104 and 105.

The first and second low-pressure communication pipes 31S and 31T, which lead a low-pressure refrigerant of the refrigeration cycle to the first and second compressing units 12S and 12T via the accumulator 25, are connected to the first and second inlet ports 135S and 135T of the first and second cylinders 121S and 121T (see FIG. 2) via the first and second suction pipes 104 and 105 as a suction section. Namely, the first and second inlet ports 135S and 135T are in parallel communication with the refrigeration cycle.

A discharge pipe 107 as a discharge section is attached to the top of the compressor housing 10; the discharge pipe 107 is connected to the refrigeration cycle, and discharges high-pressure refrigerant gas into the refrigeration cycle. Namely, the first and second outlet ports 190S and 190T are in communication with the refrigeration cycle.

The compressor housing 10 contains lubricating oil up to about the level of the second cylinder 121T. A pump vane 157 to be described later (see FIG. 7), which is inserted into the lower part of the rotating shaft 15, sucks out the lubricating oil through an oil pipe 16 attached to the lower end of the rotating shaft 15. The lubricating oil circulates through the compressing unit 12 and serves to lubricate sliding parts and seal a minute gap in the compressing unit 12.

Figure 3:
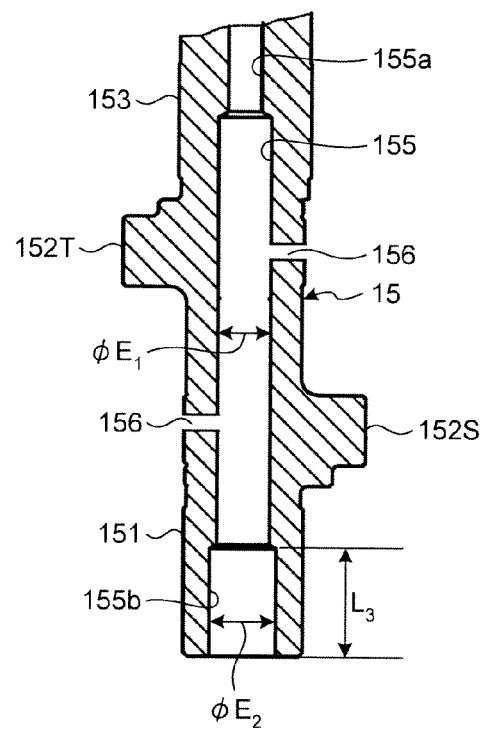
FIG. 3 is a partial longitudinal sectional view of a rotating shaft according to the embodiment.
Figure 4:
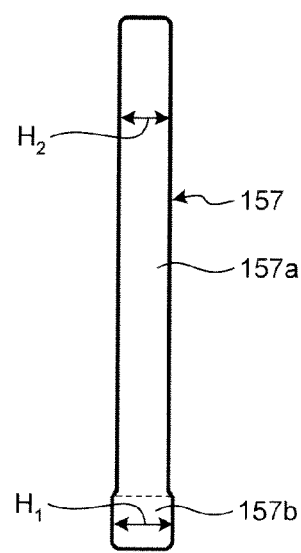
FIG. 4 is a front view illustrating the shape of a pump vane according to the embodiment before being subjected to twisting process.
Figure 5:
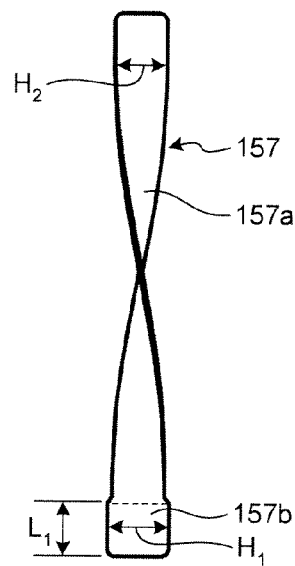
FIG. 5 is a front view illustrating the shape of the pump vane according to the embodiment after being subjected to the twisting process.
Figure 6:
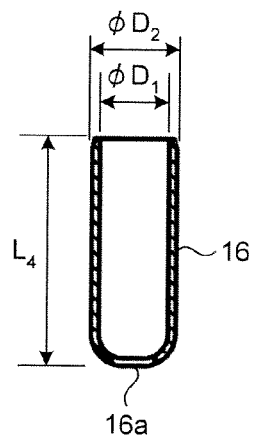
FIG. 6 is a longitudinal sectional view of an oil pipe according to the embodiment.
Figure 7:
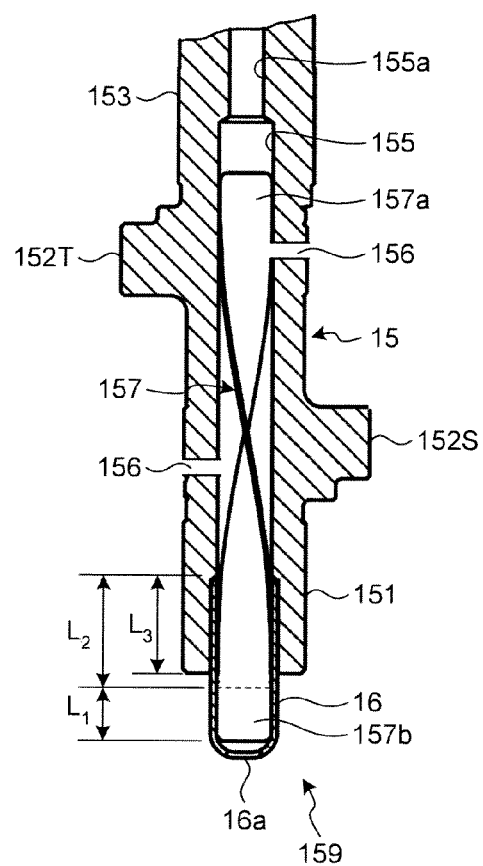
FIG. 7 is a longitudinal sectional view illustrating an oiling mechanism according to the embodiment.

Subsequently, an oiling mechanism, which is a characteristic constitution of the rotary compressor according to the embodiment, is explained with reference to FIGS. 3 to 7. FIG. 3 is a partial longitudinal sectional view of the rotating shaft according to the embodiment. FIG. 4 is a front view illustrating the shape of the pump vane according to the embodiment before being subjected to twisting process. FIG. 5 is a front view illustrating the shape of the pump vane according to the embodiment after being subjected to the twisting process. FIG. 6 is a longitudinal sectional view of the oil pipe according to the embodiment. FIG. 7 is a longitudinal sectional view illustrating the oiling mechanism according to the embodiment.

As illustrated in FIG. 3, in order from the bottom, a vertical fitting hole 155b, vertical oil holes 155 and 155a, and multiple lateral oil holes 156 for supplying lubricating oil from the vertical oil hole 155 to the compressing unit 12 (see FIG. 1) are formed on the rotating shaft 15. The vertical fitting hole 155b is formed to have an inner diameter $\phi E_2$ larger than an inner diameter $\phi E_1$ of the vertical oil hole 155.

As illustrated in FIGS. 4 and 5, the pump vane 157 is made of a steel plate, and includes a vane portion 157a and a base portion 157b which is wider than the vane portion 157a. The vane portion 157a has a 180-degree twisted shape by being subjected to twisting process. As illustrated in FIG. 6, the oil pipe 16 is made of a softer material than those of the rotating shaft 15 and the pump vane 157, such as copper or aluminum, and has an inlet port 16a on the lower end and an opening on the upper end.

Subsequently, a size relation among components composing an oiling mechanism 159 in the embodiment and a method of assembling the components are explained. First, the base portion 157b of the pump vane 157 is pressed and fixed into the lower part of the oil pipe 16. A width $H_1$ of the base portion 157b has a size relation of interference fit ($H_1 > \phi D_1$) to an inner diameter $\phi D_1$ of the oil pipe 16; so the oil pipe 16 is deformed and its diameter is expanded.

Next, the vane portion 157a of the pump vane 157 is inserted into the vertical oil hole 155 of the rotating shaft 15. The upper end of the oil pipe 16 is press-fitted into the vertical fitting hole 155b, thereby fixing the oil pipe 16 to the rotating shaft 15. A length $L_4$ of the oil pipe 16 is about two times longer than a depth $L_3$ of the vertical fitting hole 155b of the rotating shaft 15, and the lower end of the oil pipe 16 projects downward from the vertical fitting hole 155b.

A distance $L_2$ from the upper end of the base portion 157b of the pump vane 157 press-fitted into the lower part of the oil pipe 16 to the upper end of the vertical fitting hole 155b is larger than the depth $L_3$ of the vertical fitting hole 155b ($L_2 > L_3$). Therefore, the lower part of the oil pipe 16, which has undergone deformation and diameter expansion due to the press-fit of the base portion 157b of the pump vane 157, is located outside of the vertical fitting hole 155b of the rotating shaft 15.

An outer diameter $\phi D_2$ of the oil pipe 16 has a size relation of interference fit ($\phi D_2 > \phi E_2$) to the inner diameter $\phi E_2$ of the vertical fitting hole 155b. A width $H_2$ of the vane portion 157a of the pump vane 157 is smaller than the inner diameter $\phi D_1$ of the oil pipe 16 and the inner diameter $\phi E_1$ of the vertical oil hole 155 of the rotating shaft 15 ($H_2 < \phi D_1$, $H_2 < \phi E_1$). Because of this, there is a space between the vane portion 157a and the oil pipe 16 and the vertical oil hole 155. Moreover, the oil pipe 16 is made of copper or aluminum that is soft. Therefore, the press-fit does not cause any of deformation and diameter reduction of the oil pipe 16, deformation and diameter expansion of the countershaft portion 151. As a result, no increase in sliding resistance of the rotating shaft 15 is brought about.

By the oiling mechanism 159 including the oil pipe 16, the pump vane 157, the vertical oil holes 155 and 155a, and the lateral oil holes 156 described above, lubricating oil retained in the lower part of the compressor housing 10 is sucked out through the oil pipe 16 and circulated through the countershaft portion 151, the compressing unit 12, and the main shaft portion 153.

According to one embodiment of the present invention, the advantages are produced that deformation or diameter expansion of a countershaft portion of a rotating shaft is prevented, and that an increase in sliding resistance of the rotating shaft is also prevented.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A rotary compressor comprising:
    a hermetically-sealed compressor housing that includes a refrigerant outlet in the upper part thereof and a refrigerant inlet in the lower part thereof, and retains lubricating oil in the lower part thereof;
    a compressing unit that is placed in the lower part of the compressor housing and compresses a refrigerant sucked through the refrigerant inlet to discharge the compressed refrigerant through the refrigerant outlet;
    a motor that is placed in the upper part of the compressor housing and includes a rotating shaft connected to the compressing unit to drive the compressing unit via the rotating shaft, the rotating shaft having a vertical oil hole and a lateral oil hole for supplying the lubricating oil; and
    an oiling mechanism that supplies the lubricating oil to the compressing unit through the vertical oil hole and the lateral oil hole,
    wherein the oiling mechanism includes:
        a vertical fitting hole that is formed on a countershaft portion in the lower part of the rotating shaft;
        an oil pipe that has an inlet port at the lower end and an opening at an upper end, an upper part of the oil pipe being press-fitted into the vertical fitting hole; and
        a pump vane formed of an elongate steel plate, the pump vane including a vane portion and a base portion, the vane portion having a 180-degree twisted shape, the base portion arranged at one end of the pump vane and having a width wider than a width of the vane portion, the vane portion and the base portion having substantially equal thickness, wherein the with of the vane portion is smaller than an inner diameter of the oil pipe and an inner diameter of the vertical oil hole, and the width of the base portion is slight;y wider than the inner diameter of the oil pipe for interference fit, and the pump vane is arranged in the oil pipe such that the base portion is fixed in a lower part of the oil pipe and the vane portion is disposed in the vertical oil hole, and that a space is formed between the vane portion and the oil pipe,
    whereby the countershaft portion is not deformed due to the deformation of the oil pipe.

2. The rotary compressor as recited in claim 1, wherein the vertical fitting hole has an inner diameter that is larger than an inner diameter of the vertical oil hole.

3. The rotary compressor as recited in claim 1, wherein the oil pipe is formed of a material that is softer than the material of the rotating shaft.

4. The rotary compressor as recited in claim 3, wherein the material of the oil pipe is either copper or aluminum.

5. The rotary compressor as recited in claim 1, wherein the pump vane is formed of a material that is harder than the material of the oil pipe.

6. The rotary compressor as recited in claim 1, wherein the oil pipe has an outer diameter that is larger than the inner diameter of the vertical fitting hole.

\* \* \* \* \*